United States Patent [19]
Witte

[11] 3,870,843
[45] Mar. 11, 1975

[54] ELECTRICAL APPLIANCE WITH HOUSING OF PLASTIC FOAM MATERIAL

[76] Inventor: Waldemar Witte, Panoramaweg 17, D-7157 Murrhardt, Germany

[22] Filed: Dec. 22, 1972

[21] Appl. No.: 317,721

[30] Foreign Application Priority Data
Feb. 17, 1972 Germany............................ 2207347

[52] U.S. Cl............. 200/302, 174/52 P, 174/110 F, 240/10.6 R
[51] Int. Cl............................ H01h 9/04, H01h 9/06
[58] Field of Search .. 200/61.85, 157, 161, 166 SD, 200/60, 72 A, 153 W, 302; 240/10.6 R, 10.66; 174/52 P, 110 F

[56] References Cited
UNITED STATES PATENTS

| | | | |
|---|---|---|---|
| 2,924,679 | 2/1960 | Brown........................ | 200/51.09 X |
| 3,160,718 | 12/1964 | Andis............................ | 200/157 X |
| 3,270,149 | 8/1966 | O'Shea et al. ............ | 200/166 SD X |
| 3,340,390 | 9/1967 | Imre............................ | 240/10.66 X |
| 3,436,775 | 4/1969 | Schlosser et al................ | 174/110 F |

*Primary Examiner*—Robert K. Schaffer
*Assistant Examiner*—William J. Smith

[57] ABSTRACT

Electrical appliance, such as a flashlight, wherein the battery and light bulb socket are embedded in a plastic housing which is molded around them. Provision is made for the subsequent installation of an on-off switch. The invention also relates to the method of making the appliance.

4 Claims, 5 Drawing Figures

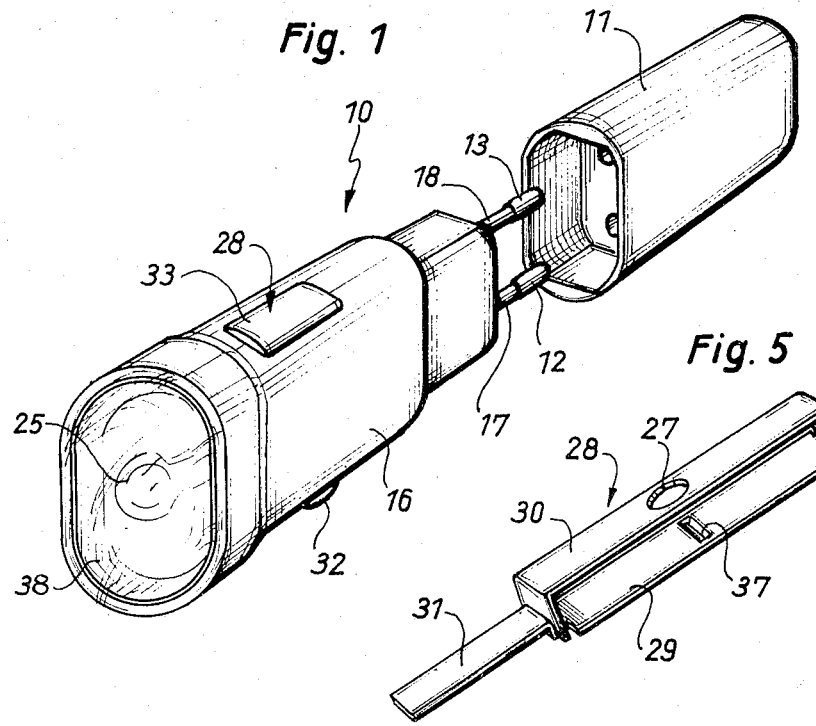
Fig. 1
Fig. 5
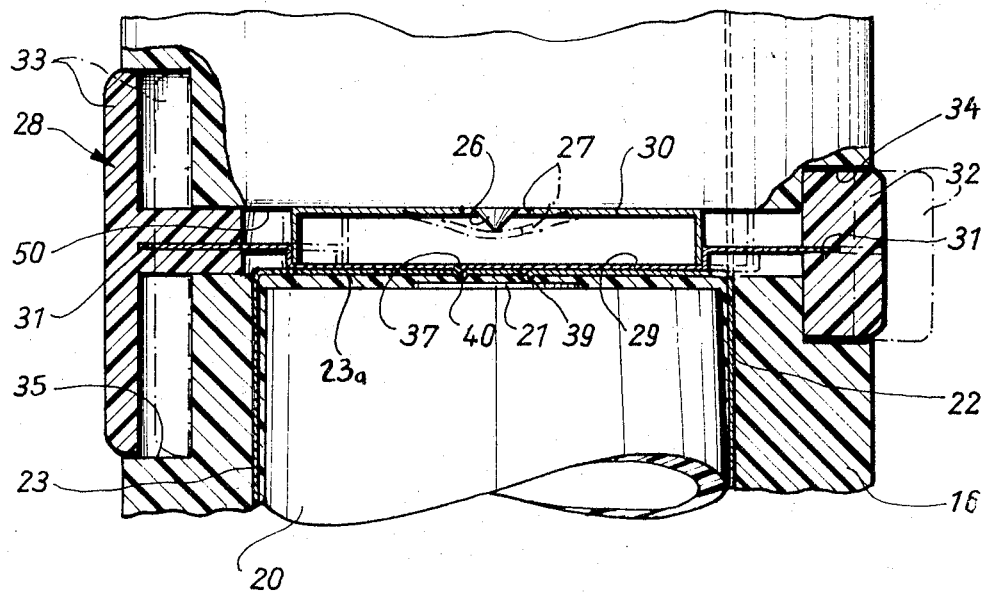
Fig. 4

ELECTRICAL APPLIANCE WITH HOUSING OF PLASTIC FOAM MATERIAL

This invention relates to an electrical appliance, in particular cordless flash lights and the like, with a battery located in a housing, which has a switching element operated at the outer side of the housing, and in which the connected electrical parts form a fixed structure which is surrounded and embedded in a plastic material, and a method to produce the same.

It is already known to completely embed electrical components in a plastic coating, e.g. epoxy resin. In this case, first of all the switching arrangement is formed as a fixed (rigid) material. The production of such electrical appliances was up to now limited to essentially closed switching elements or single parts, as for instance relays, condensors, heating elements for immersion heaters and similar heaters; that is, such production was limited to appliances and their parts which were built-in in other housings or were separated and surrounded by housing walls.

In making the already known appliances made out of plastic, the parts, connected with each other by wire will be inserted in an existing housing which consists of one or more parts; the construction parts are secured therein and thereafter the housing parts are connected with each other, e.g. by bolding, fastening, or gluing.

The production of these appliances require more than one procedure. Moreover, the parts for the housing have to be produced in a separate operation, so that the costs for producing these appliances are relatively high. It is among the objects of the invention to provide a method of producing electrical appliances, and in particular small electrical appliances having improved mechanical and electrical properties. In accordance with the present invention all constructional and electrical parts of the appliance which are in the interior of the apparatus, with the exception of the switching arrangement, are embedded in a plastic material. The plastic material is formed in a mold or forming tool by a reaction foam procedure, in which one uses a loose core in place of the switching arrangement. The core is removed after hardening of the formed plastic, and thereafter the switching arrangement is placed into the provided space in the housing. The procedure of this is limited to a minimum of manual labor. As soon as all the construction parts, as for example the batteries and battery-charging parts, as well as under certain circumstances the electricity consuming part of the small electrical appliance, are mechanically and electrically connected with each other to form a fixed construction, by the way of welding, crimping or the like; this composite insert will be placed into a suitable mold and will be fixed in a defined position. The plastic components will then, in the pressure-foam-procedure, be carefully mixed with each other, the components usually consisting of monomer and activator or hardener, and a foaming gas-producing ingredient. Thereafter this reactioning and foam mixture is poured into the mold to completely fill the hollow spaces in the mold. After hardening of the plastic foam, the construction parts will be securely embedded. The plastic material even forms the outer walls of the electrical small appliances, so that after hardening the part taken from the hardened mold will be ready for use with the exception of the switching arrangement which is still to be put in. Contrary to the other parts, the switching element has to remain movable; for this reason a loose core is provided in the mold; the mold and core can be provided with a coating of a parting layer, so they can be removed from the molded product more easily.

According to a preferred example, the apparatus has a recess for receiving the switching elements, contact means on the switching element coacting with countercontacts which are fixedly arranged within the flashlight.

An especially simple design of the slide switch can be achieved according to the invention, when the recess is built as a channel which laterally penetrates the apparatus, and the switch is provided with a slide switch which is disposed in this channel, the switch being slidable according to the switching position into the apparatus housing from the diametrically opposed sides of the flashlight. For this purpose, the switching arrangement can, according to the invention, be built as a rectangular slide frame which is formed from leaf springs with lateral tongues for the fastening of switching buttons thereto. With such a switching arrangement there is preferably arranged a projection in the leaf spring which glides over the current rail, the projection, depending on whether the switch is in "on" or "off" position, is insertable into one of two grooves in the current rail in order to hold the switching element stably in the selected position. The upper leaf spring has a bore, into which one contact of the current user freely projects when the switch is in the "off" position. Thus there is possible a simple construction of the "on" and "off" switch.

There may be used as the plastic material forming the housing of the flashlight polyurethane, which is formed by means of a low pressure foam process from starting materials consisting of polyol and isocyanate and as an addition a foaming gas-producing component. The urethane foam employed may be one known in the art as "integral-skin urethane foam," which develops its own surface skin. This eliminates the surface treatment of the molded flashlight body, as would be necessary with conventional urethane foams, as providing the product with a vinyl coating.

Further advantages and features of the invention will be apparent in the following description in conjuction with the drawings appended hereto, in which there is described an exemplary example of the invention in the form of a rechargeable flashlight. In the drawings:

FIG. 1 is a view in perspective of the illustrative embodiment of a flashlight, the cap normally mounted upon the rear end of the flashlight in order to cover the battery charging ends thereof being shown removed from the flashlight and spaced therefrom;

FIG. 4 is a view on an enlarged scale on the portion of FIG. 3 at the on-off switch;

FIG. 5 is a view in perspective of a slidable switch element in accordance with the invention.

Figure 2:
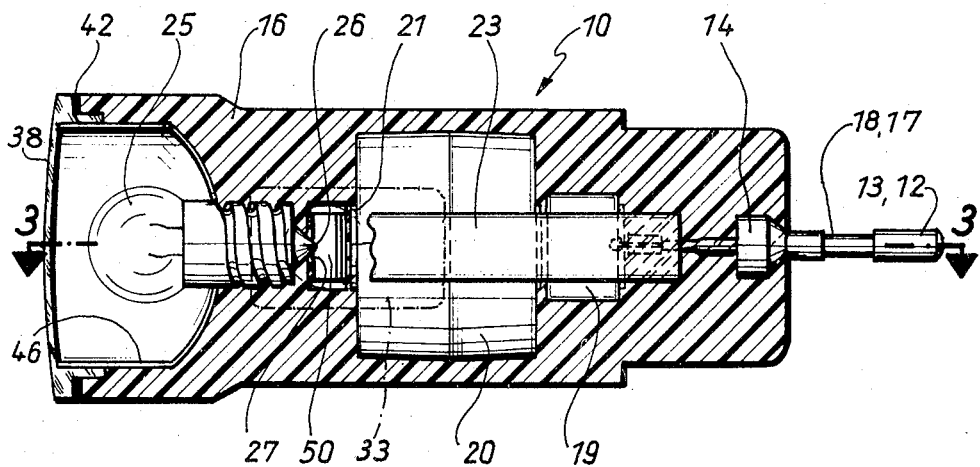
FIG. 2 is a view in longitudinal axial section through the flashlight proper in FIG. 1, certain of the parts being shown in elevation.

In the drawings there is shown an illustrative embodiment of an electrical appliance in accordance with the invention, such embodiment being in the form of a rechargeable flashlight. The flashlight proper is designated by the reference character 10, while the removable cap is designated 11 The housing 16 of the flashlight is made of a foamed plastic material which completely surrounds the electrical elements in the inside of the flashlight and at the same time form the outer walls of the flashlight. All the spaces between the various electrical elements within the flashlight are filled with plastic material. This results in an appliance which is stable in form, is compact and impact resistant, with a smooth poreless exterior surface. At the same time, the elements in the flashlight, while being securely held therein, are cushioned by the foamed plastic material making up the housing 16. The flashlight is provided with male or pin contacts 12 and 13 and spaced rearwardly projecting conductors 17, 18 by which the battery of the flashlight may be recharged, when necessary. During normal use, the cap 11 is telescoped over the rear end of the flashlight in order to enclose the contacts 12, 13.

Figure 3:
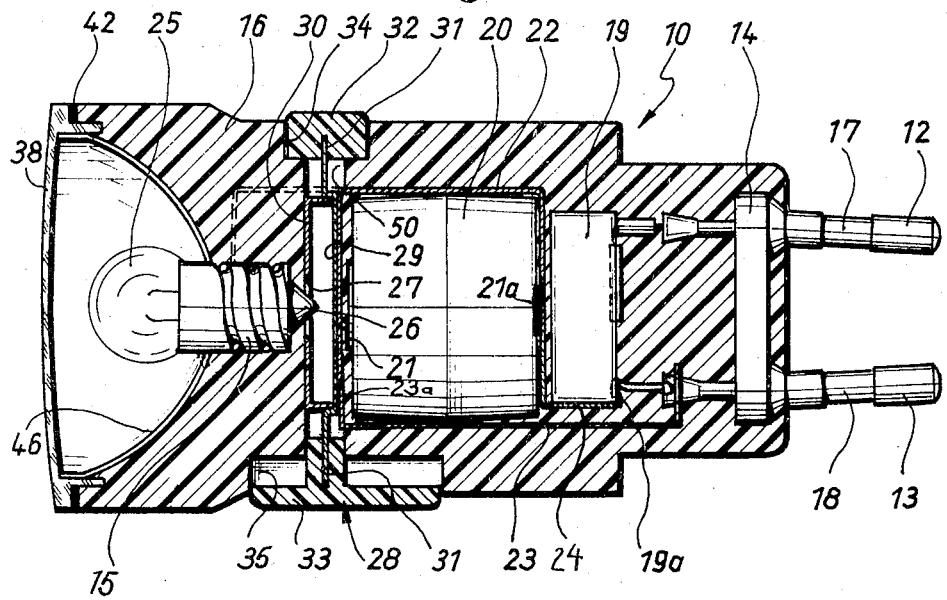
FIG. 3 is a view similar to FIG. 2 but with the sectioning plain displaced 90 degrees from that in FIG. 2, the section being taken along the line 3—3 in FIG. 2.

The interior construction of the flashlight is most clearly shown in FIGS. 2 and 3. The contacts 12, 13 are mounted in an electrically insulating bridge member 14 to which the conductors 17, 18 are connected, the bridge member 14 forming an insert in the invertably molded housing 16. The conductor 17 is connected interiorly of casing 16 to one terminal on a composite circuit element (not shown) contained in a casing 19, the composite element having a current rectifier and a condenser. A two-celled rechargeable battery 20 is molded into the housing 16, the negative pole 21 of the battery 20 being connected by an electrically conductive strap member 23 to the contact 13 through the conductor 18. The positive terminal 19a of the circuit element 19 is also connected to the positive pole 21a of the battery by a conductor strap member 24. From the positive pole 21a there leads a further conductor strap member 22 which extends through the plastic material of the housing 16 to the outer threaded metal sleeve member 15 forming the socket for receiving the lightbulb 25, as shown in FIG. 3.

The central contact 26 of the lightbulb 25 protrudes into a transverse passage 50 in the body of the flashlight, there being a slidable switch element 28 (FIGS. 3, 4, 5) in the passage 50, the switch element 28 connecting the central contact 26 of a lightbulb to the negative pole 21 of the battery 20 when the switch element is in its phantom line position FIG. 4, and disconnecting the contact 26 from the negative pole 21 of the battery when the switch element 28 is in a position thereof shown in FIG. 3 and in the full line position thereof shown in FIG. 4. These functions of the switch will be more readily understood upon consideration of FIGS. 4 and 5.

The switch element 28, as shown in FIG. 5, as an upper body member in the form of a broad capital U with a flat strip 30 in the form of a leaf spring and a lower member having a strap 29 in the form of leaf spring parallel to the member 30, the other ends of the member 29 being continued past the zones of connection with the side members of the upper switch part to form oppositely longitudinally outwardly projecting tongues 31. As will be apparent in FIGS. 3 and 4, after the switch element 28 has been installed in the passage 50 in the flashlight body, the switch operating knobs 32, 33 are mounted upon the wings 31 and secured thereto. Such knobs are received within the respective recesses 34 and 35 on the opposite side of the flashlight body.

A strap-like conducter strip 23 extends from the inner end of the conductor 18 longitudinally of the flashlight housing 16 along the side of the battery 20 and is then bent to overlie the forward end of the battery 20 and to define the wall of the passage 50 which lies adjacent the end of the battery. (See FIG. 4.) At two laterally spaced positions overlying the negative pole 21 of the battery 20 the portion 23a of the conductor 23 is provided with two formations 39–40 therein, such formations being convex in a direction toward the pole 21 and engaging such pole. The conductor portion 23a is thus constantly connected to the negative pole of the battery, whereas, as we have seen, the threaded outer sleeve of the lamp socket 15 is constantly connected to the positive pole of the battery. The switch element 28 selectively connects the contact 26 of the lamp bulb to the negative pole of the battery and disconnects it therefrom. It performs such function by being led longitudinally of the passage 50 upon the pressing inwardly of a respective knob 32, 33. The switch element 28 is provided with a longitudinally central hole 27 through the member 30 thereof, hole 27 freely receiving the central contact 26 of the lamp bulb when the switch element is in the position of FIG. 3, so that the contact 26 does not engage the member 30 of the switch element. In order stably to retain switch element in such "off" position, the member 29 of the switch element is provided with a longitudinally central D-dash shaped formation 37, the convex side of formation 37 being received within the concave side of formation 40 in the conductor 23a when the switch element is in its left hand (FIG. 4) "off" position. When the switch element is thrust to the right by pressing the knob 33 inwardly the central contact 26 of the lamp bulb engages the member 30, which is formed as a resilient strip or leaf spring, thereby deflecting it into the phantom line position of FIG. 4. This completes the circuit through the switch element 28 between the negative pole 21 of the battery and the central contact 26 of the lamp bulb, thereby energizing the lamp bulb. The switch element 28 is stably held in its "on" position by the reception of the formation 37 in the member 29 of the switch element in the concave side of the second V-shaped depression 39 in the conductor portion 23a.

The lense 38 is fixedly secured to the housing 16 of the flashlight. The head of the flashlight, surrounding the lamp bulb 25, is provided with a metallic reflector 46 which may be secured to the housing by being placed within the housing forming mold as an insert therein. A rubber or rubber-like sealing ring 42 may be provided in order to seal the reflector and the lamp bulb mounting space in the head of the flashlight form the atmosphere. This renders a flashlight water-tight, so that it can be used under water. Not only is the flashlight water-tight, but it resists seawater, will float in water, and is resistant to variations in temperature. The weight of the flashlight in accordance with the invention is markedly less than that of prior comparable flashlights, so that the flashlight is handy and light. The flashlight can be made automatically in great numbers so that the operator time and cost of production can be held low.

The illustrative embodiment of the flashlight is made as follows: The pin contacts 12, 13, the bridge 14, the transformer and rectifying-containing casing 19, the battery 20, and the conductor strips 22, 23, 23a, 24, are connected to the elements as shown. The lamp bulb socket 15 is connected to the conductor 22, the reflector 46 is mounted about the socket 15, and the lens 38 is mounted on the outer end of a reflector. Bulb 25 will have been mounted in the socket 15. The thus described assembly is mounted as an insert in a mold having a cavity of the appropriate shape, and provided with a core or two opposed cores, which are to form the passage 50. A mixture of appropriate ingredients, such as those to form foamed urethane, is poured into the mold to form the housing 16. After the foamed plastic material has hardened, the mold parts are separated and the core or cores are removed from the product. A switch element 28 is then slipped into the passage 50, and switch actuating buttons 32, 33 are mounted on the respective tongues 31 of the switching element, being retained thereon as by adhesive.

Although the invention is illustrated and described with reference to one preferred embodiment thereof, it is to be expressly understood that it is in no way limited to the disclosure of such a preferred embodiment but is capable of numerous modifications within the scope of the appended claims.

What is claimed is:

1. A small cordless electrical appliance having a main body, comprising in combination,
   a plurality of stationary electrical components;
   said plurality of stationary electrical components being firmly embedded in solidified plastic foam material;
   said solidified plastic foam material forming a passage;
   a single slidably movable switching element mounted in said passage;
   said plastic foam material forming the final outer surface of said main body.

2. The small cordless electrical appliance as set forth in claim 1, wherein said plastic foam material is polyurethane.

3. The small cordless electrical appliance as set forth in claim 2, wherein said polyurethane is integral-skin urethane foam.

4. The small cordless electrical appliance as set forth in claim 3, wherein said polyurethane foam is formed by means of a low pressure foam process.

* * * * *